United States Patent [19]
Reinders

[11] Patent Number: 6,044,437
[45] Date of Patent: Mar. 28, 2000

[54] METHOD FOR GENERATING AND TRANSFERRING REDUNDANCY BITS BETWEEN LEVELS OF A CACHE MEMORY HIERARCHY

[75] Inventor: James Reinders, Portland, Oreg.

[73] Assignee: Intel Corporation, Santa Clara, Calif.

[21] Appl. No.: 08/968,059

[22] Filed: Nov. 12, 1997

[51] Int. Cl.[7] ...................................................... G06F 11/08
[52] U.S. Cl. .............................. 711/122; 714/6; 714/710; 711/133; 712/300
[58] Field of Search ..................................... 711/122, 133; 712/300; 710/68; 345/503; 704/501, 504; 714/6, 710; 395/202, 114; 707/101

[56] References Cited

U.S. PATENT DOCUMENTS

| | | | |
|---|---|---|---|
| 5,561,779 | 10/1996 | Jackson et al. | 711/122 |
| 5,634,109 | 5/1997 | Chen et al. | 711/143 |
| 5,829,027 | 10/1998 | Goodrum | 711/122 |
| 5,883,640 | 3/1999 | Hsieh et al. | 345/503 |

*Primary Examiner*—B. James Peikari
*Attorney, Agent, or Firm*—Blakely, Sokoloff, Taylor, & Zafman LLP

[57] ABSTRACT

A method and apparatus are provided for reducing the number of cache line data transfers among components of a computer system, thus reducing the amount of traffic on a bus and increasing overall system performance. A sideband communication line is provided to transfer information from a source cache agent pertaining to redundant data strings occurring in a cache line to a destination cache agent. If redundant data strings occur in a cache line, the transfer of one or more portions of a cache line from the source to the destination can be canceled. Redundancy logic is provided to detect occurrences of redundant data strings located in a given cache line, generate and transfer redundancy bits when predetermined redundant data strings occur and decode redundancy bits at a destination cache agent to determine whether redundant data strings occur in subsequent cache lines to be transferred. The components benefiting from this invention can include a processor with its own on-chip L1 cache, a L2 or L3, an I/O controller or any other component that can perform cache functions. Alternative embodiments are provided of redundancy logic operating in parallel with data and instruction busses as well as redundancy logic operations occurring serially with the data and instruction busses.

44 Claims, 5 Drawing Sheets

METHOD FOR GENERATING AND TRANSFERRING REDUNDANCY BITS BETWEEN LEVELS OF A CACHE MEMORY HIERARCHY

FIELD OF THE INVENTION

The present invention relates to the field of computer systems and, more particularly, the present invention relates to compressing cache data transfers.

BACKGROUND OF THE INVENTION

Throughout the development of computer systems, a primary emphasis has been focused on increasing the speed of such systems and their ability to handle larger and more complicated programs while reducing their cost. In order to increase the ability of a computer system, it is necessary to both increase the size of the random access memory (RAM) so its larger programs may be utilized by the computer system and to increase the speed at which access to that RAM is afforded. The straight forward method of increasing access speed is to use components which operate more quickly. However, such rapidly-operating components are more expensive than slower memory components.

With the cost involved in providing high speed RAM, advanced computer systems conventionally use high-speed cache memory arrangement to increase the operational speed of the memory system. A cache memory arrangement provides a small portion of an especially fast memory in addition to the standard RAM. When commands are issued and data is utilized, the information is called from the RAM and stored in this cache memory. As each new read and write command is issued, the system looks to the fast memory cache to determine is the information is stored in the cache. If the information is available in the cache memory, access to the RAM is not required and the command may be processed or the data accessed much more readily. If the information is not available in the cache memory, the new data can be copied from the main memory and stored in the cache memory where it can be accessed and remain for later use by the system. In well designed memory systems, information can lie in the cache memory an average of over 90% of the time. Consequently, use of the cache memory substantially speeds the overall operation of the memory utilized in the computer system.

In order to further enhance the speed of the operation of the computer system, it has been found desirable to directly associate a small portion of extremely rapid cache memory directly on a processor chip. For example, it may be useful to provide such a small fast cache memory consisting of 8 kilobytes of memory directly on the chip along with the other elements of a Central Processing Unit (CPU). Such an arrangement is capable of greatly increasing the speed of the operation of the system to a great degree in the case of information used repeatedly by various processes.

Today, cache memories are commonly designed at two levels: a first level (L1) cache and a second level (L2) cache. An L1 cache is a single layer of high speed memory between a microprocessor and main system dynamic RAM (DRAM) memory. L1 caches hold copies of code and data most frequently requested by the microprocessor and are typically small ranging from 4 kilobytes to 64 kilobytes in size. The L2 cache, on the other hand, is a second layer of high speed memory between the L1 cache and the main system DRAM memory. L2 caches also hold copies of code and data frequently requested by the microprocessor. The L2 cache handles the more random memory request that the L1 cache misses. In order to simplify the handling of requests that the L1 cache misses, the L2 cache typically includes all the data of the L1 cache and more. As a result, a 12 cache is almost always larger than a L1 cache ranging in size typically from 64 kilobytes to 512 kilobytes.

Main memory satisfies the demands of caches and vector units and often serves as the interface for one or more peripheral devices. Most often, main memory consists of core memory or a dedicated data storage device such as a hard disk drive unit.

The performance of a cache is affected by the organization of the cache. Typically, there are three types of organizations that are most commonly used. These are fully associative, set associative and direct mapped or one-way set associative. In a fully associative cache memory, each item of information from the main memory system is stored as a unique cache entry. There is no relationship between the location of the information in the data cache RAM memory and its original location in the main system memory. If there are x storage locations in the cache, the cache will remember the last x main system memory locations accessed by the microprocessor. With a fully associative cache, the location of each store can hold information from any location in the main system memory. As a result, the cache requires complex tag entries to map the complete main memory system memory space, resulting in very complex and expensive cache comparison logic. Set associative cache organizations divide the data cache RAM into banks of memory, or "sets". A 2-way set associative cache divides the data cache RAM into two sets, a 4-way set associative cache into four sets, and so on. Each location in a memory page can map only to a single location in a cache set. The location in cache used for a given memory location is commonly determined by the system memory address modulo the size of the cache divided by the number of sets. For example, in a 2-way set associative cache memory, each location in the main system memory page can map in a location of either of the two cache set locations in the cache. When the microprocessor makes a memory request, the set associative cache compares the memory request with the tag entry at the appropriate location in each of its sets to determine if the information is in the cache, known as a hit. This means the cache must perform one comparison for each set, for a total number of comparisons equal to the number of sets. For example, in a 2-way set associative cache memory, the cache would only have to make two parallel comparisons to determine if the information requested is stored in the cache.

A direct mapped (1-way set associative cache organization) uses the entire data cache RAM as one bank of memory or set. Each location in any main system memory page directly maps only into a single location in the data cache RAM. The location in cache used for a given memory location is commonly determined by the system memory address modulo the cache size.

In prior art, a separate cache controller is used to provide access to the L2 cache. The cache controller is separate from the processor in the computer system, usually as a separate compute chip. The cache controller is a very complicated logic. Most processors systems contain two such controllers, one to control the L1 cache within the processor and the other to control the L2 cache in the system. The design of these two controllers is a compromise between performance and complexity of state that must be shared between them. The system of such hierarchical caches would provide the highest overall performance if the two cache controllers had access to information of both the cache memories and the processor and bus accesses.

Another problem with the prior art is that the L2 cache is on the system bus and access to the L2 cache is limited to the speed of the system bus. For instance, if the system bus is running at 10 MHz, an access to the L2 cache can not be performed faster than 10 HMz. It would be advantageous for the processor to be able to access the L2 cache at a rate faster than that of the system bus in order to increase the overall speed of the system. With this in mind, a single controller has been developed to control both the L1 and L2 in a system implementing both caches. Details of this controller are disclosed in copending U.S. patent application Ser. No. 08/204,647 of Singh et al., assigned to the same entity as the present application.

A problem still exists with overloaded buses transferring large amounts of information in a computer system. As signal handling requirements increase, modern computer systems can get bogged down with overloaded bus lines while the internal components compete for bus access. Thus, a need exists to reduce the traffic on commonly held bus lines in a computer system. As will be seen, the present invention fulfills this need in a simple and elegant manner.

SUMMARY OF THE INVENTION

A method and apparatus are provided for reducing the number of data and instruction transfers among components of a computer system. A sideband communication line is provided to transfer information from a source cache agent pertaining to redundant data strings occurring in a cacheline to a destination cache agent. If redundant data strings occur in a cacheline, the transfer of one or more portions of a cacheline from the source to the destination is canceled. Redundancy logic is provided to detect occurrences of redundant data strings located in a given cacheline, generate and transfer redundancy bits when predetermined redundant data strings occur and decode redundancy bits at a destination cache agent to determine whether redundant data strings occur in subsequent portions of cachelines to be transferred. Alternative embodiments are provided of redundancy logic operating in parallel with data and instruction busses as well as redundancy logic operations occurring serially with the data and instruction busses.

BRIEF DESCRIPTION OF THE DRAWINGS

The present invention will be understood more fully from the detailed description given below and from the accompanying drawings of the preferred embodiments of the invention. These embodiments, however, should not be taken to limit the invention to the specific embodiments, since they are provided for explanation and understanding only.

DETAILED DESCRIPTION OF THE PRESENT INVENTION

Figure 1:
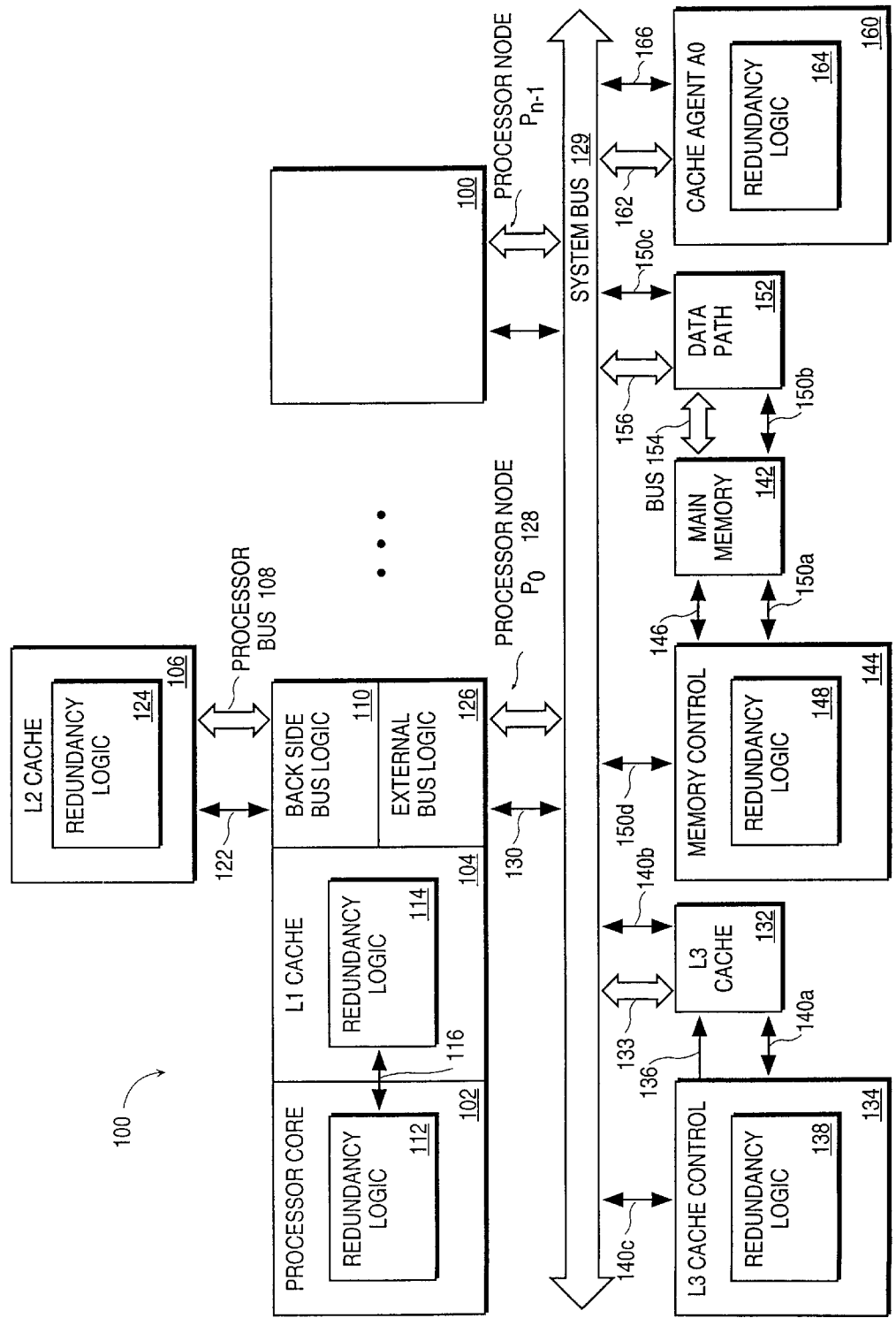
FIG. 1 is a general block diagram of a computer system incorporating one embodiment of the present invention.

A cache memory subsystem for use in a computer system is described. In the following detailed description of the present invention numerous specific details are set forth, such as specific numbers of bits, command and signal names, etc., in order to provide a thorough understanding of the present invention. However, it will be understood to one skilled in the are that the present invention may be practiced without these specific details. In other instances, well-known structures and devices are shown in block diagram form rather than in detail, in order to avoid unnecessarily obscuring the present invention.

In the description below, several terms will be used to describe embodiments of the present invention. Cache agent will mean any agent having cache capabilities such as a microprocessor, an I/O controller, main memory control, or cache control. Requesting agent will mean an agent initiating a request, typically to read or write data. Receiving agent will mean an agent receiving data. Data transfer agent will mean a requesting agent or responding agent transferring data along the system bus. Redundancy logic will mean logic circuitry configured to detect redundant data strings cachelines, redundancy detector and to generate redundancy bit generator, decode, redundancy bit decoder and transfer, transfer circuit redundancy signals. Redundancy signal will mean a signal containing information pertaining to redundant data strings located in cachelines. Sideband communication line will mean a communication line or lines used to transfer a sideband signal or set of signals containing redundancy bits from a source location to a destination location.

Also in the description below will be references to redundancies found in data strings or cache lines to be transferred from one component having cache line transfer ability to another. In this context, redundancy will include redundant occurrences of particular sets of data, such as a cache line portion of all zeros, that commonly occur in data transfers during normal operation of the computer system. These commonly occurring redundant portions are the subject of the present invention which is intended to reduce the number of transfers of these portions during normal system operation. This is discussed in further detail below.

In general, a method and apparatus are provided for reducing the number of data and instruction transfers among components of a computer system. A sideband communication line is provided to transfer information pertaining to redundant data strings occurring in a cacheline from a source cache agent to a destination cache agent. If redundant data strings occur in a cacheline, the transfer of one or more portions of a cacheline from the source to the destination can be canceled. Redundancy logic is provided to detect occurrences of redundant data strings located in a given cacheline, generate and transfer redundancy bits when predetermined redundant data strings occur and decode redundancy bits at a destination cache agent to determine whether redundant data strings occur and decode redundancy bits at a destination cache agent to determine whether redundant data strings occur in subsequent portions of cachelines to be transferred. Alternative embodiments are provided including one embodiment having redundancy logic operating in parallel with data and instruction busses and another embodiment having redundancy logic operations occurring serially with the data and instruction busses.

Referring to FIG. 1, a computer system is shown in which the present invention is utilized. The system includes a processor 100, possibly a microprocessor, having a processor core 102. Processor 100 can include an optional on chip Level 1 cache memory, L1 Cache 104, for fast retrieval of frequently used data by the processor. The processor 100 can also include an external Level 2 cache, L2 cache 106, communicating with the processor 100 via back side bus 108 through the processor's back side bus logic 110.

Figure 2:
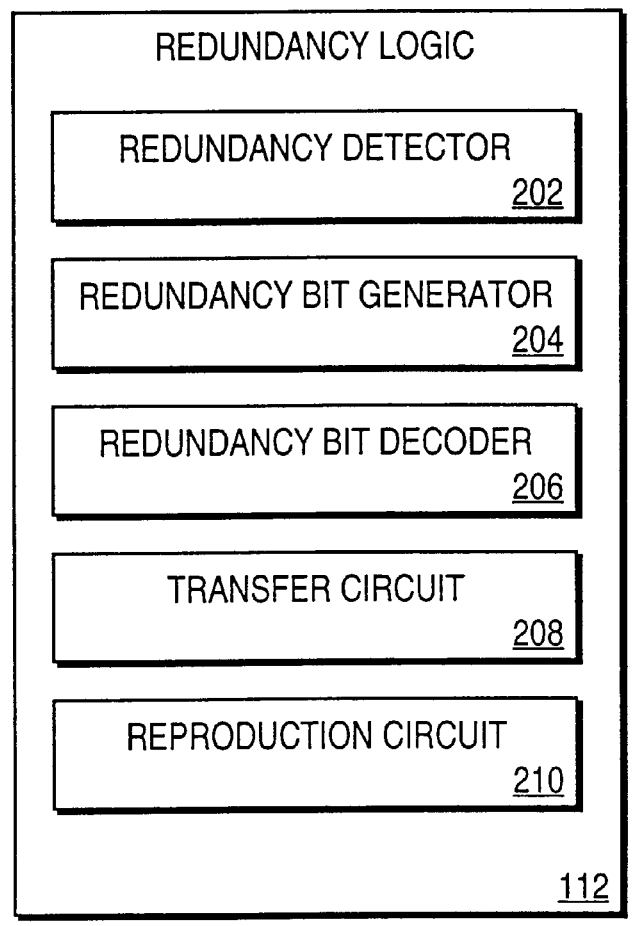
FIG. 2 is a general block diagram of redundancy logic in accordance with one embodiment of the present invention.

Included in the processor core 102 is redundancy logic 112 illustrated in more detail in FIG. 2 having redundancy detector 202 for determining redundancy of data and instructions transferred to and from the processor core 102, a redundancy bit generator 204 for generating information pertaining to redundancies in the form of redundancy bits, a redundancy bit decoder 206 for decoding incoming redundancy bits from locations outside of the processor core and a transfer circuit 208 for transferring the redundancy bits to locations outside of the processor core. The L1 cache 104 also includes similar redundancy logic 114 that communicates with the redundancy logic 112 via side band communication line 116 as illustrated in FIG. 1. Actual circuit level logic circuits are not shown in the drawings so as not to obscure the present invention. Design of circuitry such as the redundancy detector, redundancy bit generator, redundancy bit decoder and transfer circuit can be designed using common circuit design techniques well known by those a skilled in the art. The present invention is not limited to any particular method or circuit used to design these logic circuits.

Figure 3:
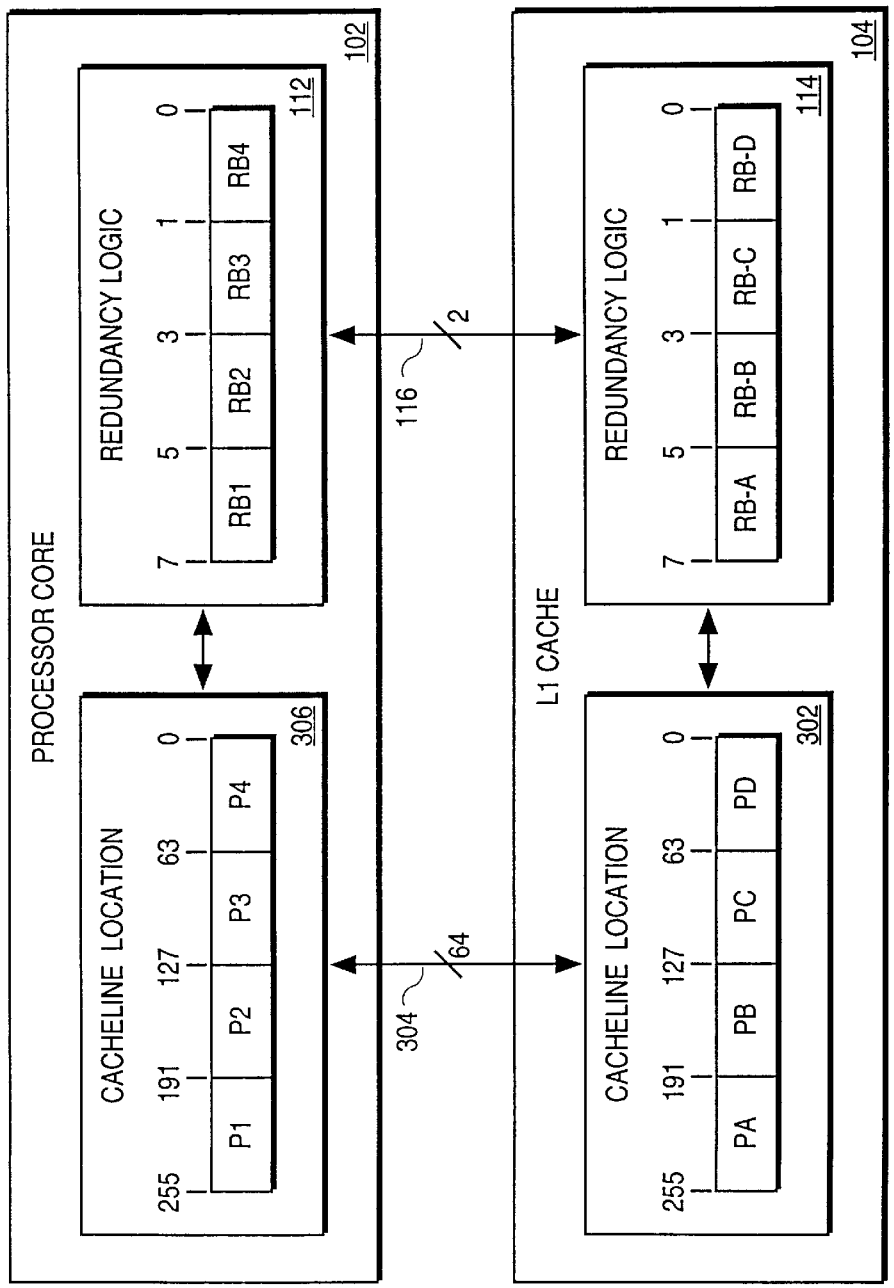
FIG. 3 is a block diagram of a redundancy logic configuration in the processor core and L1 cache in accordance with one embodiment of the present invention.

A further detailed illustration of processor core 102 and L1 cache 104 is illustrated in FIG. 3. Inside the L1 cache 104, there exists a string of data or cache line location 302, a cache memory space, divided into portions. This example assumes a cache line of 256 bits. A cache line of such size is merely intended as illustrative and is in no way intended to limit a cacheline embodying the present invention to 256 bits. Also, for this example, the cache line is divided into four equal sized portions PA, PB, PC and PD, each having 64 bits of data. The particular sizes of the portions are also intended as being merely illustrative.

The discussion below refers to different types of redundancies found in cache lines. In this context, the redundancies are intended to include portions of the cache line, a 64-bit portion for example, that frequently occur in data and instruction transfers in the system. These redundancies can include a portion containing all zeros, as well as a portion containing any particular data string that a designer designing the system decides occurs in a significant frequency. Such statistical analysis would be required in order to determine whether such an investment in redundancy logic as discussed below would be worthwhile for any particular application. Another feature of the present invention provides the detector to determine whether or not a particular portion or cache line has been transferred from one location such as a cache memory to some destination where the information was used or processed and then returned to the original location unmodified. The redundancy logic could effectively cancel the return transaction of the unmodified data, eliminating an unneeded transaction on a data or instruction bus. This would help. This would help achieve one of the primary objects of the present invention to reduce the number of cache line transfers in a system in order to free up data and instruction busses for use by other system components.

Still referring to FIG. 3, each portion is transferred from the L1 cache 104 to the processor core 102 via 64 bit data or information bus 304 communicating between the processor core 102 and L1 cache 104. In conventional systems, each portion would be transferred to the corresponding location, reassembling the cache line data into portion locations P1, P2, P3 and P4 in cache line location 306, a processor core 102 location such as a register. However, utilizing the present invention, transfers of one or more cache line portions can be eliminated using redundancy logic 112 of the processor core 102 along with redundancy logic 114 of L1 cache 104.

In one embodiment of the present invention, redundancy logic 112, 114 determines whether redundancies occur in a cache line, generates redundancy bits indicating whether redundancies occur in a portion of a cache line, decodes redundancy bits and transfers the redundancy bits pertaining to a particular portion of the cache line being transferred to the destination location. For example, assuming that data is being transferred from the L1 cache 104 to the processor core 102, redundancy logic 114 would transfer redundancy bits via side band communication line 116 to the processor core redundancy logic 112, indicating whether redundancies exist in the cache line 302 to be transferred. In this example, the redundancy logic 114 will generate redundancy bits RB-A, RB-B, RB-C, RB-D which correspond to portions of cache line 302 PA, PB, PC, PD. These redundancy bits are transferred parallel to the portions from cache line 302 so that the information can be coordinated between cache lines 302, 306 and redundancy logic 114, 112. How this is done is illustrated in FIG. 4.

Figure 4:
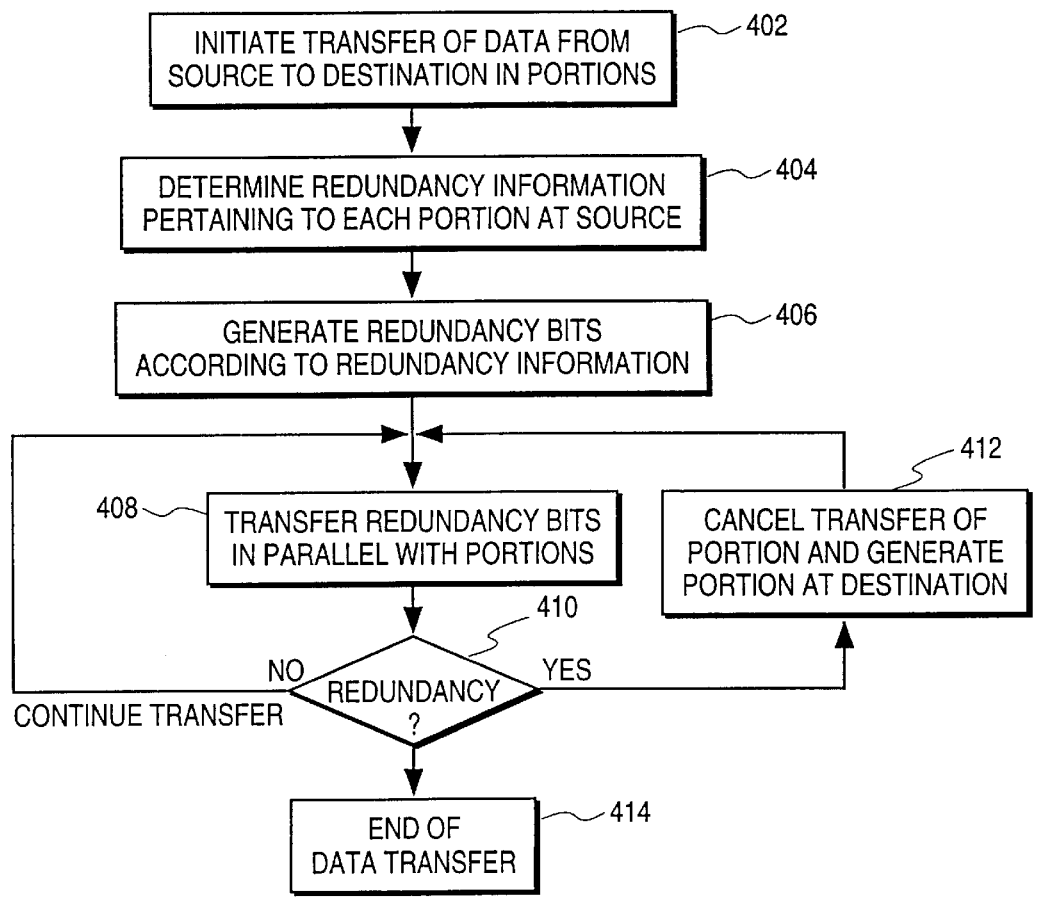
FIG. 4 as a flow diagram of transferring data in parallel with redundancy bits in accordance with one embodiment of the present invention.

Referring to FIG. 4, the first 402, assuming that the redundancy bits are transferred from the L1 cache 104 to the processor core 102 in parallel with the portions of the cache line being transferred, is to initiate transfer of data from the source of the destination portions. The next step 404 is to determine redundancy information pertaining to each portion of the source, for example, FIG>3, the source being the L1 cache 104. The next step 406 is to generate redundancy bits according to the redundancy information generated. This is accomplished using redundancy logic 114 of FIG>3. The next step 408 is to transfer the redundancy bits parallel with the cache line portions from the L1 cache 104 to be processor core 102. The portions are transferred one by one in parallel with corresponding redundancy logic where the redundancy bits are decoded in the redundancy logic 112 of the processor core to determine whether or not redundancies exist in a portion being transferred from the L1 cache line 302.

It is important to note that the set of redundancy bits being transferred with any one portion contains redundancy information pertaining to one or more portions being transferred subsequent to the presently transferred portion. For example, along with portion PA being transferred from the L1 cache line 302 to the processor core cache line 306, redundancy bits pertaining to portion PB would be transferred. This is essential because if portion PB contains redundant data, its transfer would be canceled by redundancy logic 112, thus freeing up bus 304 for other transfers along bus 304, freeing up bus 304 for other transfers.

Still referring to FIG. 4, while redundancy bits are being transferred in parallel with the cache line portions, a determination is make at step 410 of whether the redundancy exists in a subsequent portion. If no redundancy exists, transfer of data is continued until transfer of the cache line is completed, ending the sequence of step 414, or until a redundancy occurs. If a redundancy occurs in a subsequent portion, the destination redundancy logic, in FIG. 3 example busses or core redundancy logic 112, will decode the redundancy bits and generate the portion at its respective location in cache line 306. The redundancy logic at the source, in the example of FIG. 3 the L1 cache's 104 redundancy logic 114 will cancel the transfer of the portion having redundant information.

As a working example, still referring to FIG. 3, it will be assumed that 64-bit portion PB of L1 cache line 302 contains all zeros. Therefore, along with portion PA being transferred along bus 304, redundancy bits RB-B will be transferred in parallel with portion PA indicating to redundancy logic 112 that portion PB has all zeros. The redundant logic 114 will not only transfer these bits, but will also cancel the transfer of portion PB from the L1 cache 104 to the processor core 102. Redundancy logic 112 in the processor core 102 will decode redundancy bits RB-B and will determine that portion PB, destined for cache line location P2 in cache line 306 will not be transferred. Redundancy logic 112 will then generate all zeros for placement and location P2 of cache line 306. Transfer of further portions will then continue until the end of the transfer of cache line 302.

Referring again to FIG. 3, a 64-bit bus 304 and two bit side band communication line 116 is shown bridging the processor core 102 with L1 cache 104 to transfer data, instructions and redundancy bits between processor core 102 and L1 cache 104. The bus 304 could be configured to transfer data or instructions or both between the two components. Although not illustrated in the components shown in FIG. 3, some components have separate data and instruction busses. Other components have separate cache memory location for data and the instruction. In most applications, instructions are modified less frequently than data and the instructions. In most applications, instructions are modified less frequently than data stored in cache memories. For this reason, having the ability to cancel the transfer of an instruction on a return path to cache memory unmodified can greatly reduce the traffic on an instruction bus to the cache memory where the instruction originated. Similarly, since data is transferred and modified frequently, canceling of transfers of redundant data to requesting agents, responding agents and receiving agents can be advantageous.

The transfer of portions of all zeros have been found to be frequent in many applications. For example, when a cache memory is first initialized in a system, the system generally zeros out the portions of memory by transferring all zeros to the cache lines. This can be accomplished simply by transferring, via side communication line 116, a signal to store all zeros throughout the affected cache lines. Normally, systems do not have separate algorithms or hardware for zeroing out portions of cache memories; therefore, the present invention can accomplish a more efficient zeroing out the cache memory using the same hardware for all other data and instruction transfers.

Still referring to FIG. 3, the side band communication line 116 is shown as having two lines. The number of lines chosen for this illustration is arbitrary and can include greater or fewer lines. The use of two lines allows for four degrees of freedom for identifying redundancy bits. For example, for the parallel configuration where redundancy bits are sent in parallel with associated cache line portions, a redundancy bit combination can be configured as follows:

| | |
|---|---|
| 00 | Transfer portion |
| 01 | Cancel transfer, store all zeros |
| 10 | Cancel transfer, store all ones |
| 11 | Cancel transfer, store (predetermined sequence) |

Predetermined sequences may be engineered into a system statically or they may be dynamically agreed upon by source and destination agents depending on the needs of the given system. It will be apparent to one skilled in the art that different combinations can be configured to adapt to any particular application. Also, for every line added to the side band communication line, the number of possible combinations doubles.

The use of two lines for four degrees of freedom limited the example to canceling only one future transfer. It will be apparent to one skilled in the art that additional lines can be used to signal the cancellation of more than one future transfer.

Referring to FIG. 3, the use of six lines could request the cancellation of any combination of the next three transfers in parallel with the transfer of the first transfer. Combining differing amounts of these two uses of the lines allows tailoring of this invention to a wide variety of applications. For example, one line use may designate the existence and type of redundancy; the other line use may designate the number and position in the cache line of the redundancies.

At the outset of any particular application, a designer would first need to determine whether redundancies occur frequently enough in order to justify the expense of incorporating such redundancy logic and side band communication lines in a particular project. In this determination, the designer would further need to determine how much redundancy actually occurs in the particular application and whether enough transfers of data and instructions could be reduced enough to justify the investment in incorporating such redundancy logic and circuitry. Many other factors can be involved in determining whether to incorporate such redundancy logic and circuitry and how many lines to include in the side band communication line. These factors would need to be weighed on a case to case basis.

Figure 5:
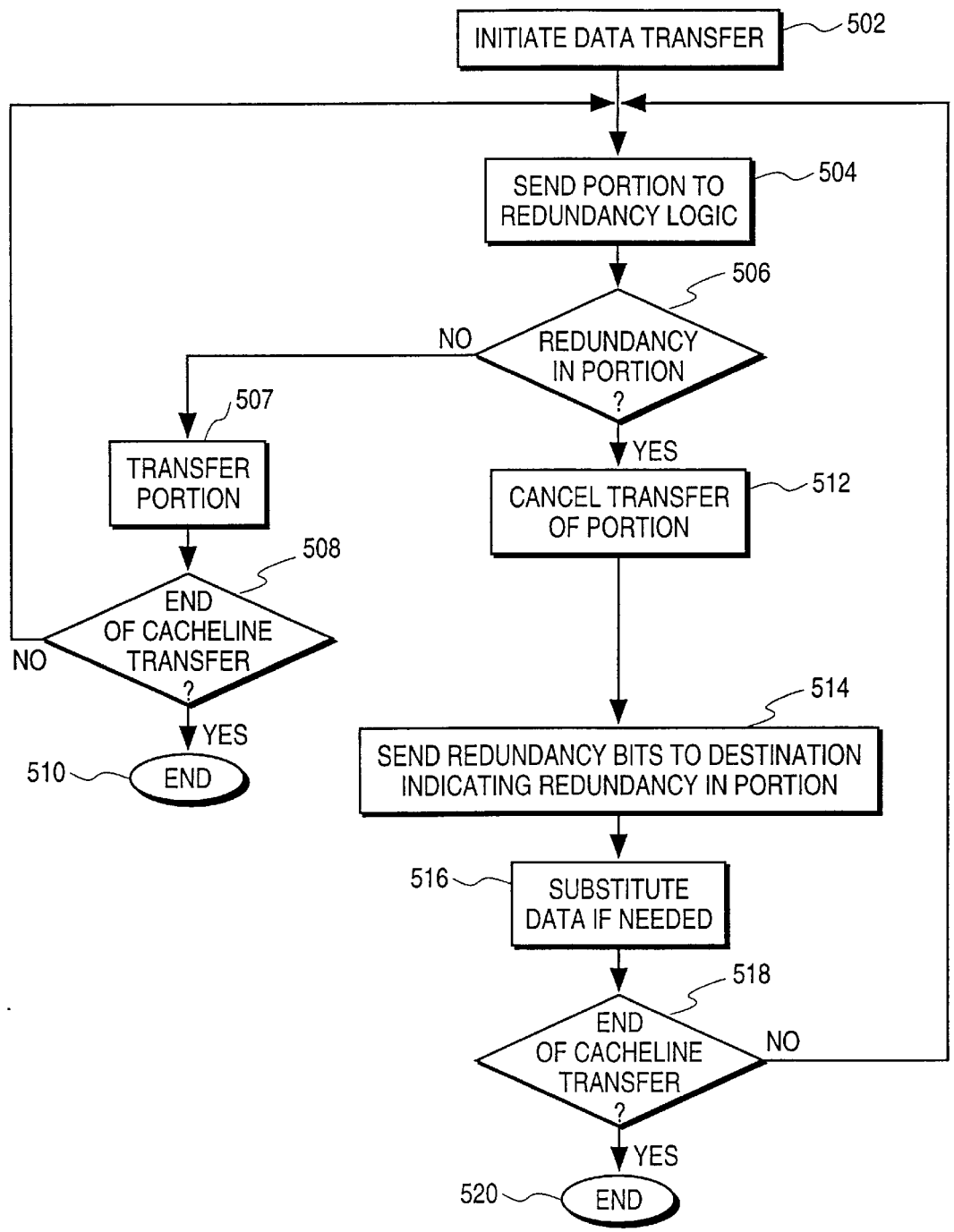
FIG. 5 is a flow diagram of the method transferring data and redundancy bits serially in accordance with one embodiment of the present invention.

Referring now to FIG. 5, a method of transferring cache line portions serially with redundancy bits is illustrated. The first step 502 is to initiate data transfer. Next, is step 504, a portion is sent to the redundancy logic in order to examine whether a redundancy occurs in the portion. In step 506, if a redundancy does not occur, the process passes to step 507 to transfer the portion and then to step 508 to determine whether the entire cache line has been transferred at this point. If transfer of the cache line has completed, the process ends at step 510. If the cache line has not been fully transferred, the process ends at step 510. If the cache line has not been fully transferred, the process returns to step 504 to send another portion of the cache line to the redundancy logic. If it is determined in 506 that the portion in question has a redundant data string, the process advances to step 512 to cancel the transfer of the portion from the source to the destination. In place of the transfer, in step 514, redundancy bits are sent indicating to the destination that the transfer of the portion has been canceled because a redundancy exists in the portion. The untransferred portion, however, must be accounted for in the next step 516. For example, if the portion not transferred is a series of zeros, zeros would need not be produced at the destination in place of the untransferred portion. As another example, if the transfer was canceled for reason of the data returning to its original location after being operated on and has not been modified, no data would need to be substituted and the process would simply proceed to the next portion.

Many possibilities can exist for accounting for the portions that are not transferred. In one embodiment, the present invention provides a dual line side band communication line 116, as shown in FIG. 3, for transmitting a two bit redundancy signal indicating the nature and existence of a redundancy in a portion to be transferred. Referring again to FIG. 2, at the source, redundancy bits are generated with a redundancy bit generator 204 of FIG. 2 in response to the redundancy detector 202 determining whether redundancy exists. Transfer circuit 208 transmits the redundancy bits using the redundancy bit decoder 206 to determine both whether the redundancy exists in a portion and, if a redundancy exists, how an untransferred portion will be accounted for. For example, if all zeros exist in a portion and the transfer is canceled, a signal could send logic bits 01 indicating that zeros need to be reproduced at the location destined for the untransferred portion. The destination could then reproduce that untransferred portion using reproduction circuit 210.

Referring again to FIG. 5, the next step 518 determines whether the cache line has been completely transferred. If it has, then the process ends at step 520. If the cache line has not completely been transferred, the process returns to step 504 to send another portion to the redundancy logic. This process would occur for all such transfers of each cache line in portions from a source location to a destination location.

Referring again to FIG. 1, further use of redundancy logic in other components having the ability to transfer cache lines, or cache agents, will now be discussed. Processor 100 includes an optional level 2 cache memory, L2 cache 106, located externally to the processor 100. Processor 100 communicates with the L2 cache 106 via back side bus 108 which is connected to the processor's back side bus logic 110. The L2 cache 106 includes redundancy logic 124 communicating with other components having redundancy logic, such as the processor core 102 and the L1 cache 104, via side band communication line 122.

The processor 100 further includes external bus logic 126 having processor node 128 connected to the system bus 129 for communication with other components in the computer system processor 100 further includes a side band communication line 130 for transferring redundancy bits among all cache agents in the system.

The system further includes and optional L3 cache 132 communicating with the system bus 129 via data and instruction bus 133. The L3 cache 132 is controlled by the L3 cache control 134 vial control line 136. The L3 cache control includes redundancy logic 138 for communicated with other cache agents. The side band communication line required for the L3 cache control can communicate with L3 cache 132 via band communication line 140(*a*) and with the system bus 129 via side band communication line 140(*b*), or can optionally communicate directly with the system bus 129 via side band communication line 140(*c*). Determination of which side band communication line to use would be optional to a system designer and would depend on the design constraints of a particular system.

Still referring to FIG. 1, the system further includes main memory 142 which could be in the form of a RAM, DRAM, SDRAM, Synchronous DRAM, Synchronous GRAM, or various other types of memory. Main memory 142 is controlled by main memory control 144 via control line 146. Main memory control includes redundancy logic 148 for transferring redundancy bits between main memory control 144 and other cache agents. Communication between the redundancy logic 148 and redundancy logic of other components in the system can be accomplished via side band communication line 150(*a*) between the main memory control 144 and main memory 142, side band communication line 150(*b*) between main memory 142 and data path 152 and side band communication line 150(*c*) communicating between the data path 152 and system bus 129. Optionally, the redundancy logic 148 can communicate directly to the system bus 129 via side band communication line 150(*d*). Main memory transfers data instructions to the system bus via bus 154 between main memory 142 and data path 152 and data bus 156 communicating between data path 152 and system bus 129.

The system further includes cache agent 160 which represents any other component located in the computer system having cache line transfer ability. A cache agent can include components communicating by bus bridge, high speed graphics modules and other components having cache line transfer ability. The cache agent 160 includes bus 162 for transferring cache line portions between the cache agent 160 and system bus 129 and further includes redundancy logic 164 communicating with other components in the system via side band communication line 166.

It is important to note that the presence of redundancy logic in one part of a system does not require its use in any or all other portions of a system. Reduction in transfers occur when both the source agent and the destination agent have sufficient redundancy logic and a method to communicate redundancy information. Source agents with redundancy logic can be readily designed to transfer without reductions due to this invention to agents without redundancy logic or to an agent with redundancy logic for which no method to communicate redundancy information exists or has sufficient efficiency to warrant its use. Similarly, destination agents with redundancy logics can be readily designed to receive data from agents without corresponding redundancy information.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

What is claimed is:

1. In a computer system having a processor with an L1 internal cache memory, a main memory for storing instructions, a redundancy circuit, a backside bus for providing a path for transferring instructions and data between the processor and the internal cache memory, and a system bus for providing a path for transferring data and instructions throughout the system, an L2 cache memory coupled to the processor, an L3 cache memory coupled to the system bus and a cache agent coupled to the system bus, a method of transferring data comprising:

providing a string of data made up of predetermined portions of data and located in a source location;

determining redundancy information pertaining to a predetermined portion;

generating redundancy bits related to the redundancy information of a predetermined portion;

transferring redundancy bits associated with a predetermined portion to a destination location; and transferring the data in predetermined portions to a destination location.

2. A method according to claim 1, wherein the step of transferring the data in predetermined portions is performed in parallel with the steps of determining redundancy information, generating redundancy bits and transferring redundancy bits.

3. A method according to claim 1, wherein the step of transferring the data in predetermined portions is performed after the steps of determining redundancy information and generating redundancy bits.

4. A method according to claim 1, wherein the step of transferring redundancy bits is perfected by transferring redundancy bits prior to transferring the associated predetermined portion.

5. A method according to claim 1, wherein the step of transferring redundancy bits is perfected by transferring redundancy bits along with transferring a predetermined portion not associated with the redundancy bits, the non-associated portion being transferring prior to transferring the associated predetermined portion.

6. A method according to claim 1, further comprising generating a portion of a string of data at the destination location according to redundancy bits associated with prior transferred portion, obviating the need for a transfer of a portion from the source location to the destination location.

7. A method according to claim 6, wherein the redundancy bits include information indicating a series of logic zeros in a predetermined portion and wherein the step of generating a portion includes generating a series of zeros.

8. A method according to claim 1, wherein the source location is a first system component having cache transfer capability and wherein the destination location is a second system component having cache transfer capability.

9. A method according to claim 1, wherein the source location is the L1 cache memory incorporated in the processor and the destination location is a register located in the processor.

10. A method according to claim 1, wherein the destination location is the cache memory incorporated in the processor and the source location is a register located in the processor.

11. A method according to claim 1, wherein the source location is the L1 cache memory incorporated in the processor and the destination location is a cache memory located external to the processor.

12. A method according to claim 11, wherein the cache memory located external to the processor is the L2 cache.

13. A method according to claim 11, wherein the cache memory located external to the processor is the L3 cache.

14. A method according to claim 1, wherein the destination location is the L1 cache memory incorporated in the processor and the source location is a cache memory located external to the processor.

15. A method according to claim 14, wherein the cache memory located external to the processor is the L2 cache.

16. A method according to claim 14, wherein the cache memory located external to the processor is the L3 cache.

17. A method according to claim 1, wherein the source location is the L1 cache memory incorporated in the processor and the destination location is the cache agent coupled to the system bus.

18. A method according to claim 1, wherein the destination location is the L1 cache memory incorporated in the processor and the source location is the cache agent coupled to the system bus.

19. A method according to claim 1, wherein the source location is the L1 cache memory incorporated in the processor and the destination location is main memory.

20. A method according to claim 1, wherein the destination location is the L1 cache memory incorporated in the processor and the source location is main memory.

21. A method according to claim 1, wherein the source location is the L2 cache memory incorporated in the processor and the destination location main memory.

22. A method according to claim 1, wherein the destination location is the L2 cache memory incorporated in the processor and the source location is main memory.

23. A method according to claim 1, wherein the source location is the L3 cache memory incorporated in the processor and the destination location main memory.

24. A method according to claim 1, wherein the destination location is the L3 cache memory incorporated in the processor and the source location is main memory.

25. A method according to claim 1, wherein the source location is a register located in the processor and the destination location is main memory.

26. A method according to claim 1, wherein the destination location is a register located in the processor and the source location is main memory.

27. A method according to claim 1, wherein the source location is a cache agent and the destination location is main memory.

28. A method according to claim 1, wherein the destination location is a cache agent and the source location is main memory.

29. A method according to claim 1, wherein the source location is a cache agent and the destination location is the L2 cache.

30. A method according to claim 1, wherein the destination location is a cache agent and the source location is the L2 cache.

31. A method according to claim 1, wherein the source location is a cache agent and the destination location is the L3 cache.

32. A method according to claim 1, wherein the destination location is a cache agent and the source location is the L3 cache.

33. A method according to claim 1, wherein the source location is a register located in the processor and the destination location is a cache agent.

34. A method according to claim 1, wherein the destination location is a register located in the processor and the source location is a cache agent.

35. A method according to claim 1, wherein the source location is a register located in the processor and the destination location is the L2 cache.

36. A method according to claim 1, wherein the destination location is a register located in the processor and the source location is the L2 cache.

37. A method according to claim 1, wherein the source location is a register located in the processor and the destination location is the L3 cache.

38. A method according to claim 1, wherein the destination location is a register located in the processor and the source location is the L3 cache.

39. A method according to claim 1, wherein the determining step includes determining whether data was previously transferred from a source location to a destination location and, if so, whether the data has since been modified and wherein the transferring step is perfected by generating a portion of a string of data at the destination location according to redundancy bits associated with a prior transferred portion, obviating the need for a transfer of a portion from the source location to a destination location.

40. A method according to claim 1, wherein the redundancy bits include information indicating that the data was originally transferred from a source location and is being transferred back to the source location unmodified, the method further comprising the step of:
if the data was previously transferred from a source location and unmodified, indicating not to transfer the data back to the source location and, if the data was previously transferred from source location and has since been modified, transferring the data back to the source memory.

41. A method according to claim 1, wherein the determining step includes indicating whether data will be transferred, wherein:

if the data was originally transferred from a source location and is unmodified from its original state, the data is not transferred.

42. A method according to claim 1, wherein the redundancy circuitry retains a list of predetermined redundant data portions, wherein the determining step includes determining whether a predetermined portion is included in the list of predetermined redundant data portions.

43. A method according to claim 1, wherein the redundancy circuitry is configured to recognize a predetermined list of commonly occurring redundant data strings, the determining step further including determining whether a data string matches a data string in the predetermined list, wherein the step of generating redundancy bits include generating redundancy bits identifying the occurrence of a data string included in the predetermined list, the method further comprising the step of decoding the redundancy bits to determine the existence of redundancy in a data string.

44. A method according to claim 1, further comprising the step of storing a portion of a string of data according to the redundant data information.

* * * * *